United States Patent [19]

Azuma et al.

[11] Patent Number: 4,813,297

[45] Date of Patent: Mar. 21, 1989

[54] DIFFERENTIAL GEAR

[75] Inventors: Hitoshi Azuma, Toyota; Kentaro Tomo, Kariya, both of Japan

[73] Assignee: Toyota Jidosha Kabushiki Kaisha, Toyota, Japan

[21] Appl. No.: 53,683

[22] Filed: May 26, 1987

[30] Foreign Application Priority Data

May 26, 1986 [JP] Japan ................................ 61-119060
May 27, 1986 [JP] Japan ................................ 61-120140

[51] Int. Cl.⁴ ........................ B60K 17/16; F16H 37/06
[52] U.S. Cl. ........................................ 74/675; 180/248
[58] Field of Search ............... 180/252, 251, 249, 248, 180/247, 233; 364/424; 74/690, 691, 675

[56] References Cited

U.S. PATENT DOCUMENTS 4,633,735 1/1987 Sakurai et al. .................. 180/247 X Primary Examiner—Charles A. Marmor
Assistant Examiner—Mitchell J. Hill
Attorney, Agent, or Firm—Oblon, Fisher, Spivak, McClelland & Maier

[57] ABSTRACT

A differential gear includes a rotatable case, pinions rotatably disposed in the case, a pair of side gears meshing with the pinions and disposed in the case, a first shaft supported rotatably about a rotary axis of the case and extending from one of side gears, a second shaft supported rotatably about the axis and extending from the other side gear in the opposite direction to the first shaft, a first driven gear provided in one of the first and second shafts, a first drive gear for rotating the driven gear to transmit driving force to the first and second shafts. A worm wheel fixed to the case, a worm meshing with the worm wheel and an electric motor are provided. The motor is controlled by a control device so as to maintain the difference between numbers of revolutions of the first and second shafts within a predetermined range.

8 Claims, 10 Drawing Sheets

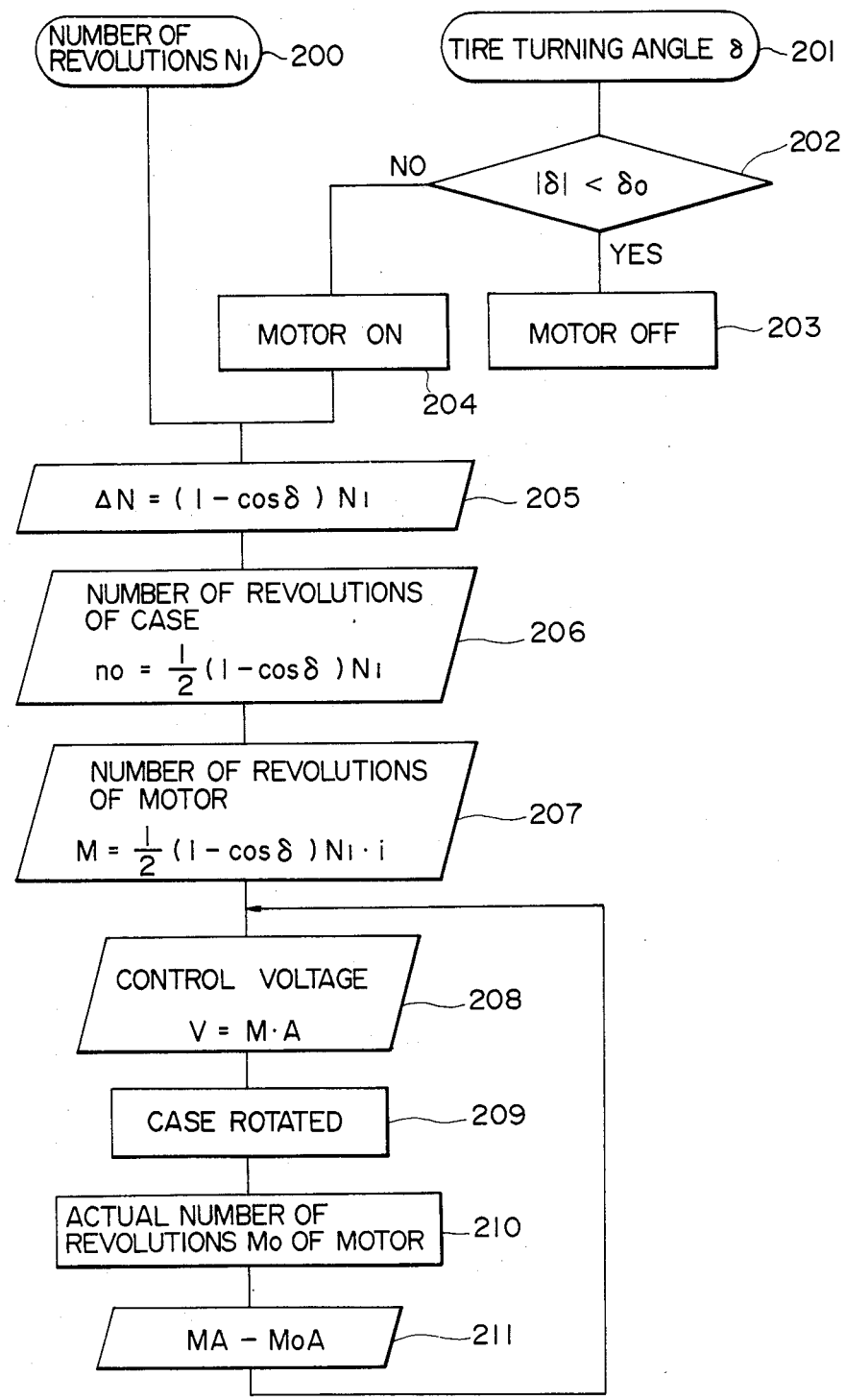

DIFFERENTIAL GEAR

BACKGROUND OF THE INVENTION

1. Field of the Invention

This invention relates to a differential gear and, more particularly, to a differential gear used suitably for a differential gear installed in a drive line of a vehicle to drive front or rear wheels and a center differential gear of a four wheel drive car.

2. Description of the Prior Art

When one of two wheels connected to a drive line having a differential gear runs onto a snow-covered road surface or the like having low coefficient of friction and then slips, such phenomena take place that driving force to other wheel connected to the drive line is reduced or utterly lost because of the inherent property of said differential gear.

The fact similar to the above applies to a center differential gear installed to absorb differential number of revolutions between front and rear wheels on a full time four wheel drive car in turning. Thus, there is proposed a special differential gear with a differential lock or a limited slip differential.

Since the special differential gear needs the differential lock or limited slip differential, the construction of the special differential gear is complicated.

When the special differential gear is provided with the differential lock, a driver has complexities that he or she has to lock and unlock the differential lock, and moreover there is a possibility of dangerous wrong operation to lock it in turning.

When the limited slip differential is incorporated in the special differential gear, driving force transmitting capacity is structurally limited. In this case, sufficient driving force cannot be transmitted.

SUMMARY OF THE INVENTION

An object of the present invention is to provide a differential gear which one of a plurality of wheels connected to a drive line having the differential gear never slips.

Another object of the present invention is to provide a differential gear which dispenses with a differential lock or a limited slip differential.

A further object of the present invention is to provide a differential gear which dispenses with any operation by a driver.

A differential gear according to the present invention comprises a rotatable case, pinions disposed rotatably in the case, a pair of side gears meshing with the pinions and disposed rotatably in said case, a first shaft supported rotatably about a rotary axis of said case and extending from one of said side gears, a second shaft supported rotatably about said axis and extending from the other side gear in the opposite direction to said first shaft, a driven means provided in one of said first and second shafts, a first means for rotating said driven means to give driving force to said first and second shafts, a worm wheel provided in said case, a second rotary means having a worm meshing with the worm wheel and a control device for controlling number of revolutions of said second rotary means to maintain the difference between number of revolutions of said first shaft and that of said second shaft within a predetermined range.

The control device is a CPU or a computer for calculating on the basis of signals from a steering angle sensor and a vehicle speed sensor to control the number of revolutions of the second rotary means.

According to another embodiment of the present invention, a driven means is fixed to said case, and a worm wheel is provided in one of the first and second shafts.

When the differential gear is used for a front differential gear of a front wheel drive car or a rear differential gear of a rear wheel drive car, the first and second shafts are respectively connected to the drive wheels.

Even if any of drive wheels runs onto snow or the like at the time of straight driving of a vehicle, since rotation of the case is ceased to maintain the difference between the number of revolutions of the first shaft and that of the second shaft to zero, there never occurs differential between first and second shafts. As a result, the drive wheel on snow or the like does not slip.

As to the embodiment in which the case is rotated by the first rotary means, the worm wheel is rotated by the second rotary means at the number of revolutions same as or slight higher than that of the case at the time of straight driving. In this embodiment, similarly, even if any of drive wheels runs onto snow or the like, the drive wheel does not slip because there never occurs substantial difference of number of revolutions between the first or second shaft having the worm wheel and the case.

According to the embodiment, the worm wheel is always rotated at the number of revolutions corresponding to a vehicle speed. However, the second rotary means needs only a small torque capacity for rotating the worm wheel because driving torque required for running the vehicle is transmitted to the first and second shafts through the first rotary means, driven means and case.

The control device calculates the difference between the number of revolutions of the drive wheel located at an outside of turning and that of the drive wheel located at an inside of turning from a steering angle and vehicle speed at the time of turning of the vehicle and controls the second rotary means to give the difference to both drive wheels.

When the differential gear in the first embodiment is used for a center differential gear of a four wheel drive car, one of said first and second shafts is connected to a propeller shaft at the front side and the other to a propeller shaft at the rear side.

Even if one of four drive wheels runs onto snow or the like at the time of straight driving of the vehicle and the drive wheel resultingly tends to rotate at the number of revolutions higher than that corresponding to the vehicle speed, the control device maintains the case in non-rotating condition, so that the difference between the numbers of revolutions of the propeller shafts at the front and rear sides becomes zero. Thus, the drive wheel does not slip.

The control device calculates the difference between the numbers of revolutions of the propeller shafts at the front and rear sides from a steering angle and vehicle speed at the time of turning of the vehicle and controls the second rotary means to give the difference to the propeller shafts at both sides.

Since the differential gear is provided with original driven means and first rotary means and further the worm wheel and second rotary means which has the worm and operates independently of said first rotary means, and the difference between the numbers of revolutions of the first and second shafts is held substantially zero at the time of straight driving and held within a predetermined range at the time of turning, one of a plurality of drive wheels is prevented from slipping. Also, smooth turning can be ensured.

Since the second rotary means is operated by the control device, a driver can be released from complexities.

Since the differential lock and limited slip differential are not needed, the construction of the differential gear can be simplified.

BRIEF DESCRIPTION OF THE DRAWINGS

The other objects and features of the invention will become apparent from the following description of preferred embodiments of the invention with reference to the accompanying drawings, in which:

FIG. 11 is a flow chart showing the operation of control.

DETAILED DESCRIPTION OF THE PREFERRED EMBODIMENTS

Figure 1:
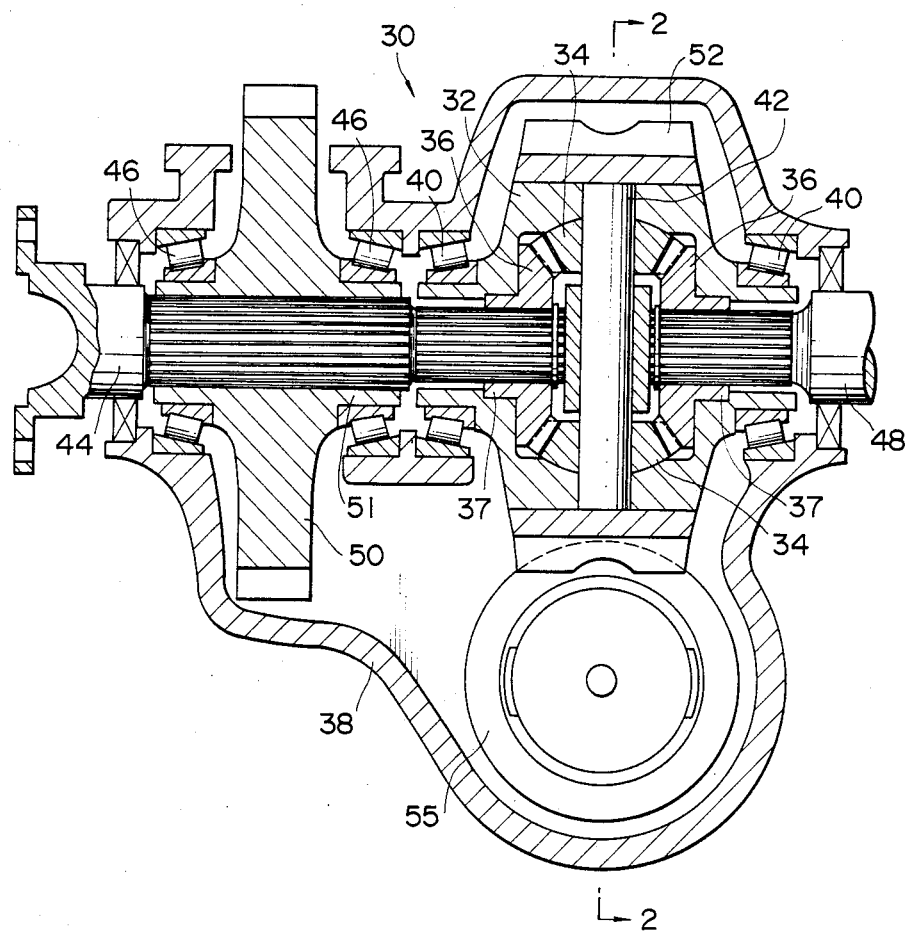
FIG. 1 is a sectional view taken along a rotary axis of a case of a differential gear.
Figure 2:
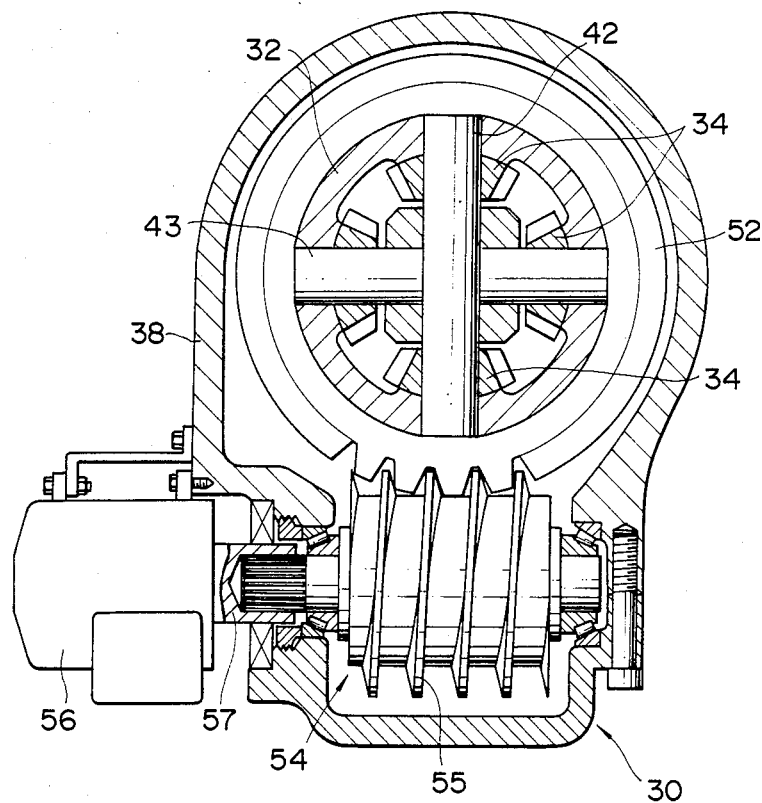
FIG. 2 is a sectional view taken along the line 2—2 in FIG. 1.

A differential gear 30 shown in FIGS. 1 and 2 comprises a case 32, pinion gears 34 and side gears 36 disposed respectively in the case 32.

The case 32 is a so-called differential case which is disposed in a differential carrier 38 and supported rotatably by a pair of roller bearings 40 attached to the differential carrier 38.

At least one pinion shaft is fixed in the case 32. In an embodiment shown in FIG. 2, two short pinion shafts 43 are disposed orthogonally to a long pinion shaft 42. These pinion shafts have their axes arranged orthogonally to a rotary axis of the case 32. By the long pinion shaft 42 and short pinion shafts 43 are rotatably supported a pair of pinions 34 axially spaced from each other. When a single pinion shaft is used, two pinions 34 are rotatably supported by the pinion shaft.

Two sides gears 36 are disposed in the case 32 and spaced from each other to mesh with four pinions 34 respectively.

A first shaft 44 is connected through serrations with one side gear 36 and extends from the case 32 in one direction. The shaft 44 projects from the differential carrier 38. The shaft 44 is supported through a boss 37 of the side gear 36 by a shoulder of the case 32 and through a first driven means which will be later described by a pair of bearings 46, said shaft 44 being rotatable about the rotary axis of the case 32.

A second shaft 48 is connected through serrations with the other side gear 36 and extends from the case 32 in the opposite direction to the first shaft 44. The shaft 48 projects from the differential carrier 38. The shaft 48 is supported through a boss 37 of the other side gear 36 by a shoulder of the case 32 and by bearings (not shown), said shaft 48 being rotatable about the rotary axis of the case 32.

A first driven means 50 is provided in one of the case 32, the first shaft 44 and the second shaft 48. In the embodiment shown in FIG. 1, the driven means 50 is a spur gear which connected through serrations with the first shaft 44. The pair of roller bearings 46 are attached between bosses 51 protruding from both sides of the spur gear 50 and the differential carrier 38, the spur gear 50 being rotatable about the same axis as the first shaft 44.

A first rotary means which will be later described engages with the first driven means 50, both means giving driving force to the first and second shafts 44,48.

A second driven means 52 is provided in one of the case 32, the first shaft 44 and the second shaft 48 which is not provided with the first driven means 50. In the embodiment shown in FIGS. 1 and 2, the second driven means 52 is a worm wheel which is fixed in the case 32 by press fitting or threading engagement well known per se.

A second means 54 for rotating the second driven means 52 comprises a worm 55 which is rotatably supported by the differential carrier 38. On the other hand, an electric motor 56 is mounted on the differential carrier 38 and a shaft of the worm 55 is connected through serrations with an output shaft 57 of the motor 56.

As will be later described, when signals from a steering angle sensor and a vehicle speed sensor are inputted to a control device, the control device calculates number of revolutions and direction of rotation of the second rotary means 54 on the basis of these signals and controls the same to maintain the difference between the numbers of revolutions of the first and second shafts 44,48 within a predetermined range including zero.

Figure 3:
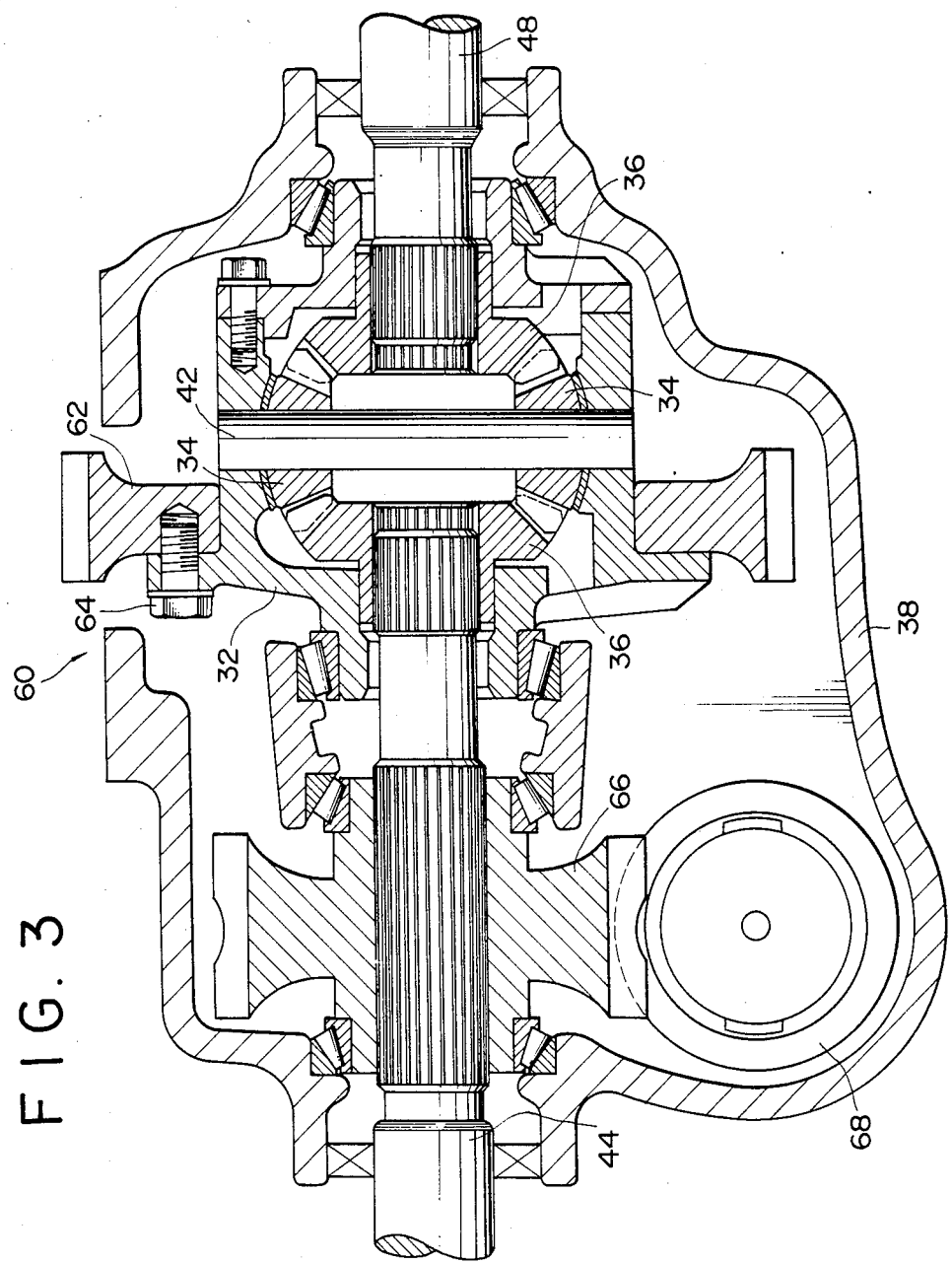
FIG. 3 is a sectional view taken along the rotary axis of the case in another embodiment of the differential gear.

A differential gear 60 shown in FIG. 3 is similar in its basic constitution to that of the differential gear 30 shown in FIGS. 1 and 2. That is, the differential gear 60 comprises the case 32 supported rotatable by the differential carrier 38, pinions 34 supported rotatably by the pinion shaft 42 disposed in the case 32 and a pair of side gears 36 disposed in the case 32 to mesh with the pinions 34. The differential gear 60 further comprises the first shaft 44 extending from one side gear 36 and the second shaft 48 extending from the other side gear 36 in the opposite direction to the first shaft 44.

In the differential gear 60, a first driven means 62 is formed of a spur gear fixed to the case 32 by bolts 64. The first driven means 62 is rotated by a first rotary means to give driving force to the first and second shafts 44,48. On the other hand, a second driven means 66 is formed of a worm wheel which is connected through serrations with the first shaft 44. The worm wheel 66 is rotated by a worm 68 included in a second rotary means to maintain the difference between the numbers of revolutions of the first and second shafts 44,48 within a predetermined range.

In the differential gear 60 shown in FIG. 3, the case 32 is rotated at the time of straight driving and the worm wheel 66 is also rotated at the number of revolutions same as or slight higher than that of the case 32. At the time of turning of the vehicle, the worm wheel 66 is rotated at the number of revolutions which gives the required difference between the number of revolutions of the first shaft 44 and that of the second shaft 48.

According to the differential gear 60, frictions between pinions 34 and the pinion shaft 42 and between the pinions 34 and the side gears 36 can be reduced.

Figure 4:
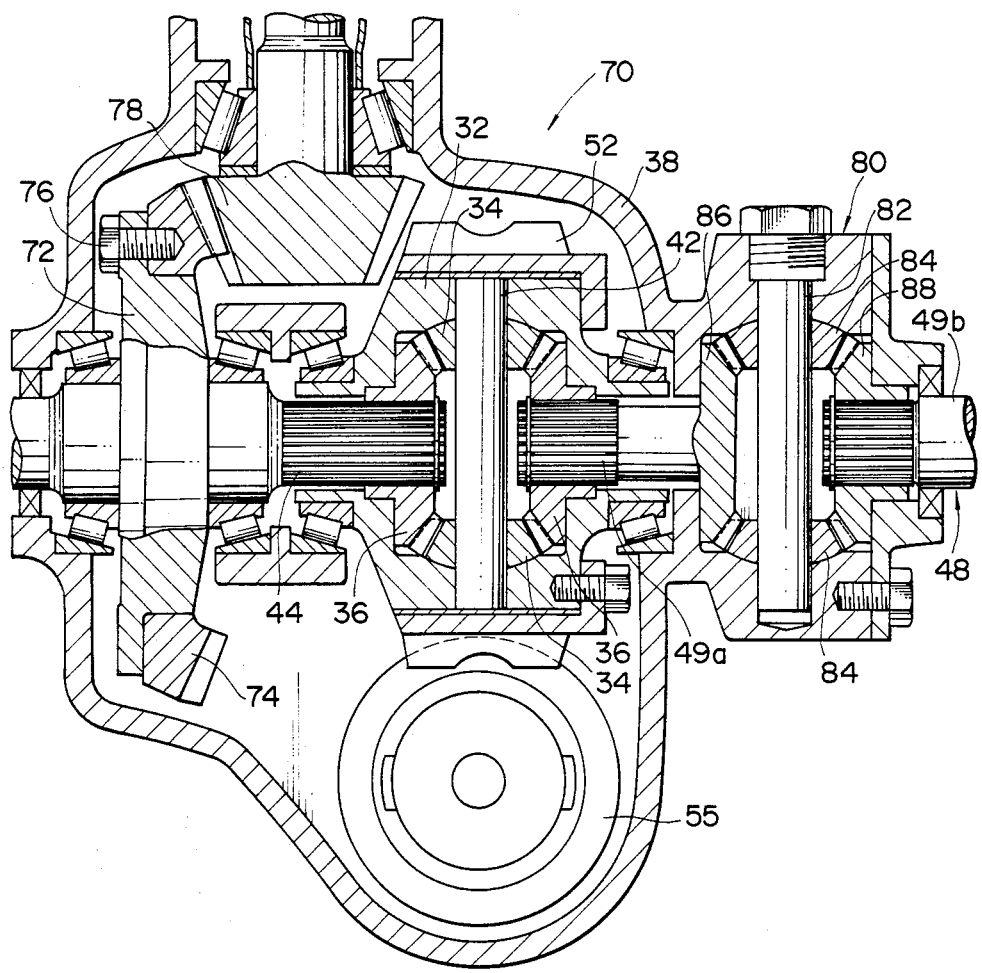
FIG. 4 is a sectional view taken along the rotary axis of the case in a further embodiment of the differential gear.

A differential gear 70 shown in FIG. 4 is similar in its basic constitution to those of the differential gears 30,60 shown in FIGS. 1 to 3. That is, the differential gear 70 comprises the case 32 supported rotatably by the differential carrier 38, pinions 34 rotatably supported by the pinion shaft 43 disposed in the case 32 and a pair of side gears 38 disposed in the case 32 to mesh with the pinions 34. The differential gear 70 further comprises the first shaft 44 extending from one side gear 36 and the second shaft 48 extending from the other side gear 36 in the opposite direction to the first shaft 44, while differing from said differential gears 30,60 in the following points:

In the differential gear 70, the first shaft 44 is formed integrally with a boss 72. A bevel gear 74 of the first driven means is fixed to the boss 72 by bolts 76. The bevel gear 74 meshes with a small bevel gear 78 of the first rotary means to transmit driving force to the first and second shafts 44,48.

An auxiliary second gear device 80 is provided in relation to the second shaft 48 of the differential gear 70. In the differential gear 70, the driving force is transmitted to the first and second shafts 44,48, respectively through the first rotary means 78 meshing with the first driven means 74 as mentioned above. Therefore, the second shaft 48 is rotated reversely to the first shaft 44. Thus, when the differential gear 70 is used for a front differential gear or rear differential gear, the rotational direction of the second shaft 48 has to be similar to that of the first shaft 44. The auxiliary gear device 80 fulfills this function.

The second gear device 80 does not have any rotatable case and a pinion shaft 82 is fixed to the differential carrier 38. Two pinions 84 are disposed in the differential carrier 38 to be rotatably supported by the pinion shaft 82. A pair of side gears 86,88 are disposed in the differential carrier 38 to mesh with the pinions 84. A first portion 49a of the second shaft 48 projects integrally from one side gear 86 to be connected through serrations with the side gear 36 of the differential gear 70. A second portion 49b of the second shaft 48 is connected through serrations with the other side gear 88 to project from the differential carrier 38.

The second driven means 52 is formed of a worm wheel fixed to the case 32. The worm wheel 52 is rotated by the worm 55 included in the second rotary means to maintain the difference between the numbers of revolutions of the first and second shafts 44,48 within a predetermined range.

Said differential gears are used in various forms.

Figure 5:
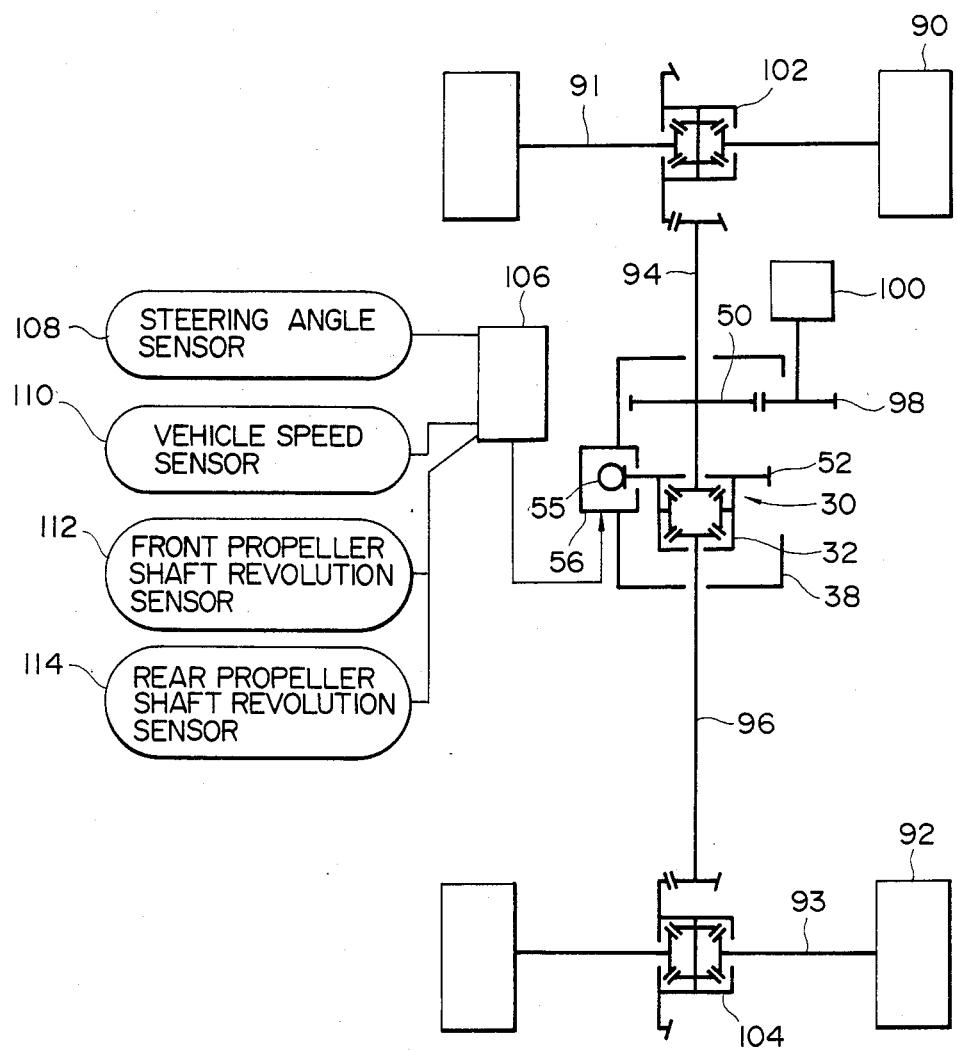
FIGS. 5 to 8 are schematic views showing the specific application of the differential gear.

Referring to FIG. 5 showing schematically the embodiment, in which the differential gear 30 is used for a center differential gear in a four wheel drive car, the differential carrier 38 is fixed to a car body between front wheels 90 and rear wheels 92 and the first shaft of the differential gear 30 is connected to a front propeller shaft 94 and the second shaft to a rear propeller shaft 96. A spur gear 98 included in the first rotary means is connected to a transmission 100 to mesh with the spur gear of the first driven means 50.

A front differential gear 102 is incorporated in a drive shaft 91 of the front wheels 90 and a rear differential gear 104 in a drive shaft 93 of the rear wheels 92, respectively. In this case, the front differential gear 102 is connected to the front propeller shaft 94 and the rear differential gear 104 to the rear propeller shaft 96, respectively.

With the constitution noted above, driving force from the transmission 100 is, on one hand, transmitted from the first driven means 50 to the front wheels 90 through the front propeller shaft 94, front differential gear 102 and drive shaft 91 and, on the other hand, transmitted from the first driven means 50 to the rear wheels 92 through the differential gear 30, rear propeller shaft 96, rear differential gear 104 and drive shaft 93.

A control device 106 is a computer or a CPU which receives signals from a steering angle sensor 108 and a vehicle speed sensor 110 well known per se. The steering angle sensor 108 detects the size of angle and steering direction. Preferably, the control device 106 receives signals from a front propeller shaft revolution speed sensor 112 and a rear propeller shaft revolution speed sensor 114 to carry out feed-back control. The control device 106 executes calculation which will be later described and controls the number of revolutions and direction of rotation of the motor 56.

Since the number of revolution of the front propeller shaft 94 is higher than that of the rear propeller shaft 96 at the time of turning of the vehicle, the electric motor 56 arranged as shown in FIG. 5 is controlled so as to reduce the number of revolutions of the rear propeller shaft 96, so that loss in controlling can be eliminated.

Figure 6:
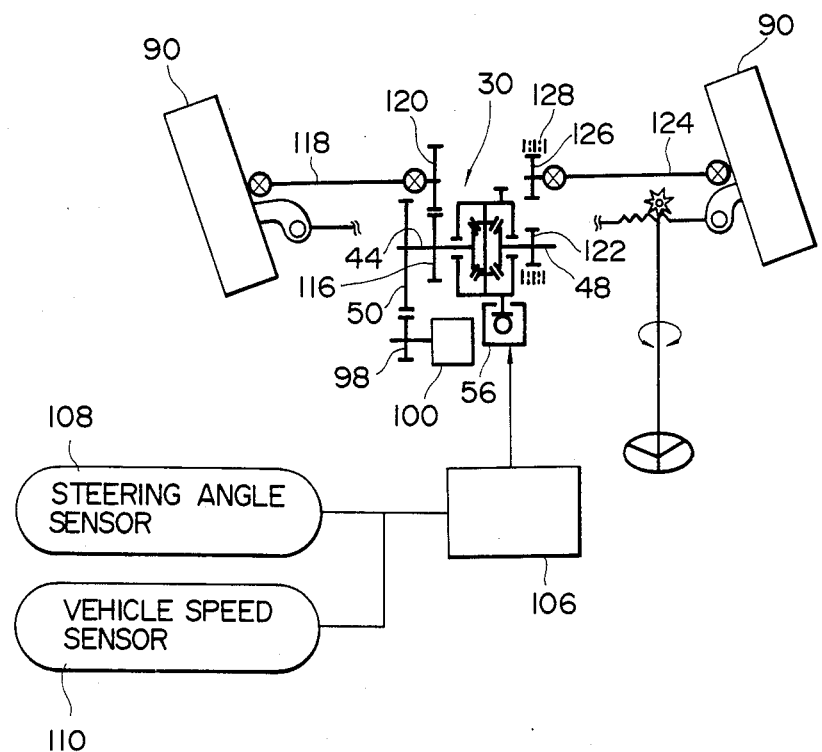

In FIG. 6 showing schematically the embodiment, in which the differential gear 30 is used for a front differential gear in a front wheel drive car, the differential gear 30 is interposed between the front wheels 90,90.

A spur gear 116 is fixed to the first shaft 44 of the differential gear 30. On the other hand, a spur gear 120 is fixed to a left drive shaft 118 to mesh with the spur gear 116. The numbers of teeth of both spur gears are equal to each other, so that the rotation of the first shaft 44 is reversed and taken out to the left drive shaft 118.

A sprocket or pulley 122 is fixed to the second shaft 48 of the differential gear 30. On the other hand, a sprocket or pulley 126 is fixed to a right drive shaft 124. A chain or belt 128 is trained over the second shaft 48 and the right drive shaft 124.

The spur gear 98 included in the first rotary means is connected to the transmission 100 to mesh with the spur gear of the first driven means 50. As a result, power from the transmission 100 is transmitted to the left front wheel 90 through a pair of spur gears 116,120 and left drive shaft 118 on one hand and to the right front wheel 90 through the differential gear 30, chain or belt 128 and right drive shaft 124 on the other hand.

The control device 106 receives signals from the steering angle sensor 108 and vehicle speed sensor 110 to control the number of revolutions and directions of rotation of the motor 56.

In the embodiment shown in FIG. 6, the rotation of the first shaft 44 of the differential gear 30 is reversed to transmit to the left drive shaft 118. When the differential gear 70 shown in FIG. 4 is used, however, the auxiliary gear device 80 is incorporated in the second shaft 48 and the rotation of the first shaft 44 is reversed to transmit to the second shaft 48. Therefore, as mentioned above, the differential gear 70 can be used for the front or rear differential gear as it is.

Figure 7:
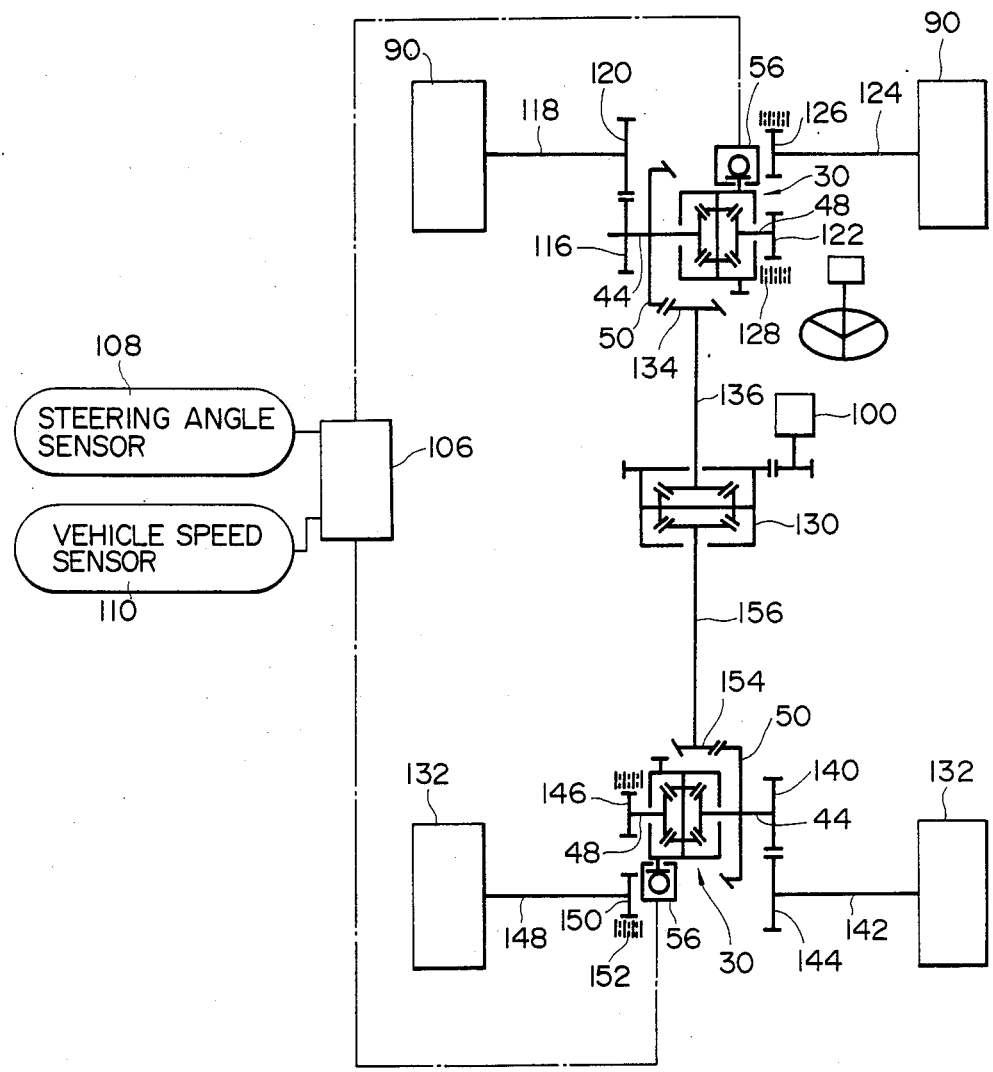

In FIG. 7 showing schematically the embodiment, in which two differential gears 30 are used for front and rear differential gears in a four wheel drive car and an ordinary differential gear is used for a center differential gear 130, the differential carrier of the front side differential gear 30 and the differential carrier of the rear side differential gear 30 are respectively disposed between the front wheels 90,90 and between the rear wheels 132,132 to be fixed to the car body.

Since the basic arrangement of the front side differential gear 30 is substantially similar to that shown in FIG. 6, detailed description is abbreviated by giving same numerals to same parts.

A bevel gear 134 included in the first rotary means is connected to a shaft 136 of the differential gear 130 and to the transmission 100 through the differential gear 130. The first driven means 50 is a bevel gear meshing with the bevel gear 134.

A spur gear 140 is fixed to the first shaft 44 of the rear side differential gear 30. On the other hand, a spur gear 144 is fixed to the right drive shaft 142 to mesh with the spur gear 140. The number of teeth of the spur gear 140 is equal to that of the spur gear 142, thereby being reversed the rotation of the first shaft 44 to be taken out to the right drive shaft 142.

A sprocket or pulley 146 is fixed to the second shaft 48 of the rear side differential gear 30. On the other hand, a sprocket or pulley 150 is fixed to a left drive shaft 148, a chain or belt 152 being trained over the second shaft 48 and the left drive shaft 148.

A bevel gear 154 included in the first rotary means is connected to a shaft 156 of the differential gear 130 and to the transmission 100 through the differential gear 130. The first driven means 50 is a bevel gear meshing with the bevel gear 154. As a result, power transmitted from the transmission 100 is transmitted to the first shaft 44 through the differential gear 130 and bevel gears 154, 50 and then transmitted on one hand to the right rear wheel 132 through a pair of spur gears 140,144 and the right drive shaft 142 and on the other hand to the left rear wheel 132 through the differential gear 30, chain or belt 152 and left drive shaft 148.

The control device 106 calculates on the basis of signals from the steering angle sensor 108 and vehicle speed sensor 110. The device controls the number of revolutions of the motor 56 for the front side differential gear 30 to maintain the difference between the numbers of revolutions of the left and right front drive shafts 118,124 within a predetermined range. The device 106 also controls the number of revolutions of the motor 56 for the rear side differential gear 30 to maintain the difference between the numbers of revolutions of the left and right rear drive shafts 148,142 within a predetermined range.

Figure 8:
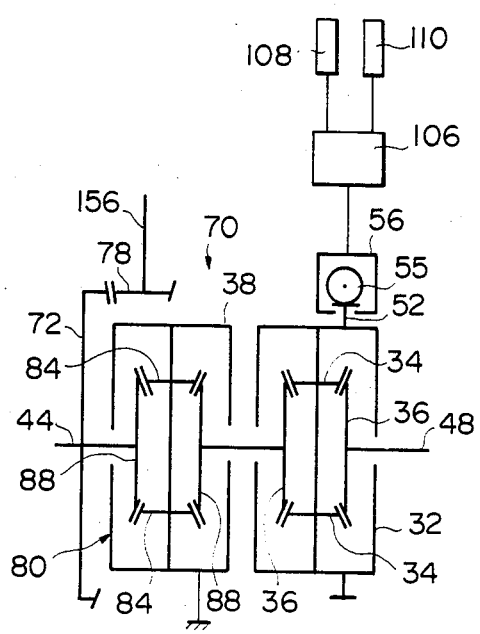

In FIG. 8 showing schematically the embodiment, in which the differential gear 70 is modified in that the auxiliary gear device 80 is provided in relation with the first shaft 44 and the differential gear 70 is used for a rear differential gear.

Driving force transmitted from a propeller shaft 156 is transmitted to the first shaft 44 through bevel gears 78,72 on one hand and to the second shaft 48 through the auxiliary gear device 80 on the other hand in which the rotation of the first shaft 44 is reversed to be taken out to the second shaft 48.

The control device 106 receives signals from the steering angle sensor 108 and vehicle speed sensor 110. The device calculates the difference between the numbers of revolutions of the first and second shafts 44,48 and controls the motor 56.

The calculation in the control device is carried out by properly using the following formulas.

Figure 9:
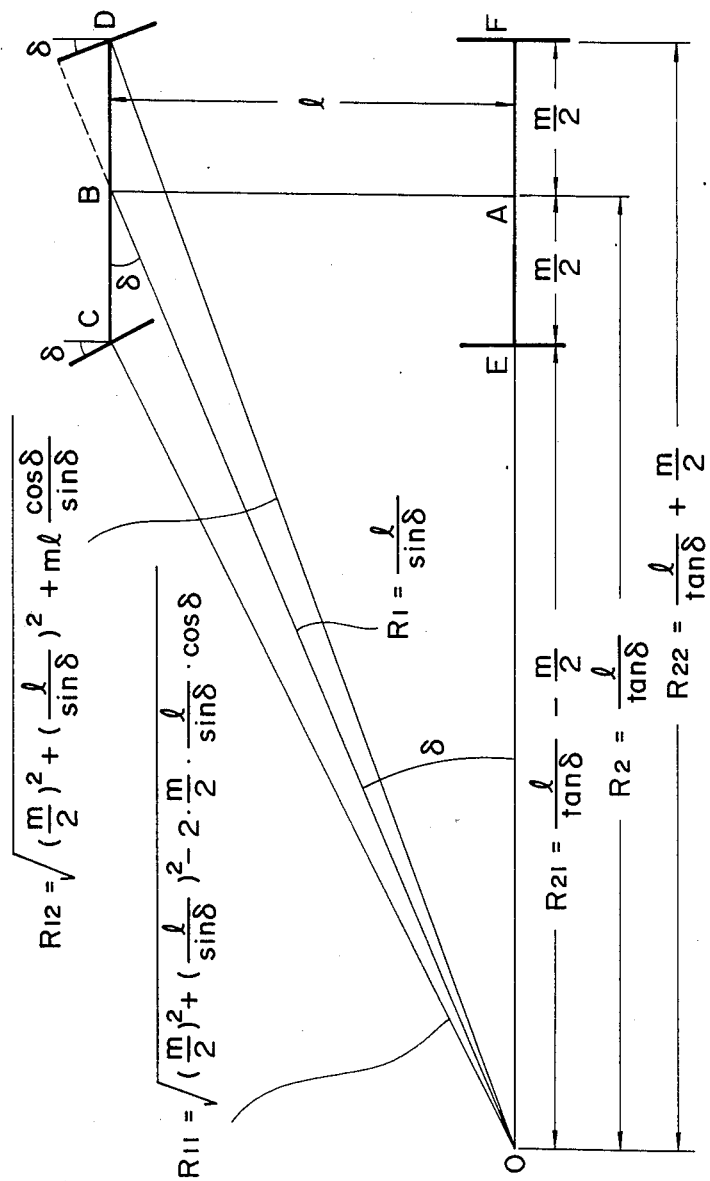
FIG. 9 is a view showing turning angle and other dimensions of a vehicle in turning.

As shown in FIG. 9, it is assumed that the number of revolutions of the front propeller shaft is set as $N_1$, a wheel base of the vehicle as $l$, a wheel tread as $m$, a tire turning angle as $\delta$ and the final reduction ratio of the front side differential gear as $i_1$. Among said factors are detected the number of revolution $N_1$ and the tire turning angle $\delta$ respectively from the vehicle speed sensor and steering angle sensor.

Then, the average turning radius $R_1$(OB) of the front wheels, average turning radius $R_2$(OA) of the rear wheels, turning radius $R_{11}$(OC) of a front inner wheel, turning radius $R_{12}$(OD) of a front outer wheel, turning radius $R_{21}$(OE) of a rear inner wheel and turning radius $R_{22}$(OF) of a rear outer wheel are given as shown in FIG. 9.

The number of revolutions $N_2$ of the rear propeller shaft, the difference $\Delta N$ between the numbers of revolutions of the front and rear propeller shafts, the average number of revolutions $n_1$ of the front wheels and the average number of revolutions $n_2$ of the rear wheels are respectively obtained from the following formulas;

$$N_2 = \cos\delta N_1$$

$$\Delta N = N_1 - N_2 = (1 - \cos\delta)N_1$$

$$n_1 = \frac{N_1}{i_1}$$

$$n_2 = \frac{N_1}{i_1} \cos\delta$$

The number of revolutions $n_{21}$ of the rear inner wheel is obtained as follows;

$$n_{21} = \frac{(l - \tan\delta \cdot m/2) \cdot N_1 \cdot \cos\delta}{l \cdot i_1}$$

from the following relationship $$\frac{R_{21}}{n_{21}} = \frac{R_2}{n_2}$$

Similarly, the number of revolutions $n_{22}$ of the rear outer wheel is obtained as follows:

$$n_{22} = \frac{(l + \tan\delta \cdot m/2) \cdot N_1 \cdot \cos\delta}{l \cdot i_1}$$

from the following relationship $$\frac{R_{22}}{n_{22}} = \frac{R_2}{n_2}$$

Thus, the differential number of revolutions $\Delta n_2$ of the rear wheels is obtained as follows;

$$\Delta n_2 = \frac{m \cdot N_1}{l \cdot i_1} \sin\delta$$

On the other hand, the number of revolutions $n_{11}$ of the front inner wheel is obtained as follows;

$$n_{11} = \frac{\sqrt{(\sin^2\delta \cdot m^2/4 + l^2 - m \cdot l \cdot \sin^2\delta/\cos\delta)}}{l \cdot i_1} \cdot N_1$$

from the following relationship $$\frac{R_{11}}{n_{11}} = \frac{R_1}{n_1}$$

Similarly, the number of revolutions $n_{12}$ of the front outer wheel is obtained as follows;

$$n_{12} = \frac{\sqrt{(\sin^2\delta \cdot m^2/4 + l^2 + m \cdot l \cdot \sin^2\delta/\cos\delta)}}{l \cdot i_1} \cdot N_1$$

from the following relationship $$\frac{R_{12}}{n_{12}} = \frac{R_1}{n_1}$$

Accordingly, the differential number of revolution $\Delta n_1$ of the front wheels is obtained as follows:
$$\Delta n_1 = (n_{12} - n_{11})$$

Figure 10:
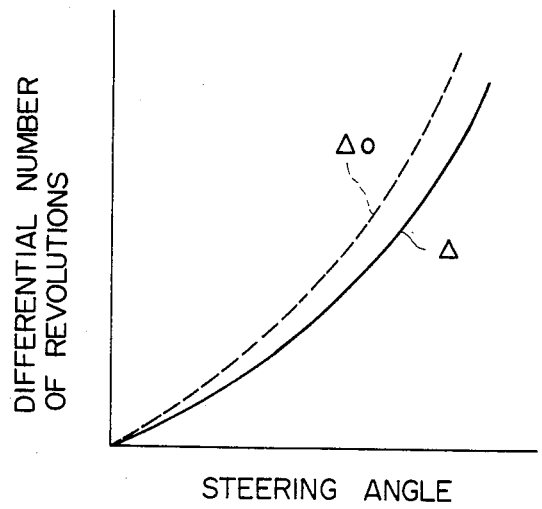
FIG. 10 is a graph showing relation between a steering angle and a differential number of revolutions.

When the electric motor 56 is rotated at the theoretical differential number of revolutions obtained by using aforementioned formulas, reaction force against the worm 55 hardly generates. Then, as shown in FIG. 10, it is preferable to utilize modified value $\Delta_o$ which is slight larger than the theoretical difference $\Delta$.

Operation of Embodiment

As shown in FIG. 5, when the differential gear 30 is used for the center differential gear, the control device 106 controls as shown in FIG. 11.

The number of revolutions $N_1$ is detected (200) from the vehicle speed sensor 110 and the tire turning angle $\delta$ is detected (201) from the steering angle sensor 108. The tire turning angle $\delta$ is compared with a predetermined value $\delta_o$ to judge (202) whether or not the turning angle $\delta$ exceeds a play range of a steering wheel. When the turning angle $\delta$ is within the play range, the operation of the motor 56 is stopped (203) and when the turning angle $\delta$ exceeds the play range, the motor 54 is operated (204).

The difference $\Delta N$ between numbers of revolutions of the front and rear propeller shafts is obtained (205) from the number of revolutions $N_1$ to calculate the number of revolutions $n_o$ of the case 32 (206). The number of revolutions M of the motor is obtained from the reduction ratio i of the worm wheel 52 and worm 55 and the number of revolutions of the case (207). Control voltage V is calculated by the use of a constant A (208). The case 32 is rotated (209) on the basis of the control voltage V and the actual number of revolutions $M_o$ of the motor 56 is detected (210). The difference between the theoretical voltage value and the detected voltage value is obtained (211) to feed back it as the control voltage V.

The second driven means is the worm wheel 52 and the second rotary means includes the worm 55 so that the worm wheel 52 can be rotated by the worm 55. However, the reverse operation, i.e., the rotation of the worm 55 by the worm wheel 52, is impossible according to the property of the worm 55. Thus, the differential gear 30 is securely controlled by the number of revolutions and directions of rotation of the motor 56.

We claim:

1. A differential gear comprising:
   a differential carrier to be mounted on a vehicle body;
   a rotatable case disposed rotatably in the carrier;
   pinions disposed rotatably in the case;
   a pair of side gears disposed rotatably in said case to mesh with the pinions;
   a first shaft supported rotatably about a rotary axis of said case and extending from one of said side gears;
   a second shaft supported rotatably about said rotary axis and extending from the other side gear in the opposite direction to said first shaft;
   driven means provided in one of the first and second shafts for transmitting driving force to the shafts;
   first means for rotating the driven means;
   a worm wheel fixed to a portion outside said case to be rotated therewith and disposed in the differential carrier;
   second means for rotating the worm wheel having a worm meshing with the worm wheel and disposed in the differential carrier and an electric motor fixed to the differential carrier, a shaft of the motor being connected to the worm; and
   a control device means for calculating on the basis of signals from a steering angle sensor and a vehicle speed sensor to control the number of revolutions of said second means.

2. A differential gear as claimed in claim 1, wherein said control device controls the second means so as to maintain the difference between the numbers of revolutions of said first and second shafts within a predetermined range.

3. A differential gear as claimed in claim 2, wherein an electric motor is included in said second means and rotated at the number of revolutions slight higher than the theoretical value obtained by calculation.

4. A differential gear as claimed in claim 1, wherein the differential gear is disposed between front and rear propeller shafts and used for a center differential gear in a four wheel drive car, and wherein the shaft provided with the driven means is connected to the front propeller shaft, whereby said second means is controlled at the time of turning of the car so as to reduce number of revolutions of the rear propeller shaft.

5. A differential gear as claimed in claim 1, wherein the differential gear is disposed between right and left drive shafts, and wherein one of said first and second shafts is connected to one of the right and left drive shafts through a gear train and the other of the first and second shafts is connected to the other of the right and left drive shafts through a transmitting device.

6. A differential gear comprising:
   a differential carrier to be mounted on a vehicle body;
   a rotatable case disposed rotatably in the carrier;
   pinions disposed rotatably in the case;
   a pair of side gears disposed rotatably in said case to mesh with the pinions;
   a first shaft supported rotatably about a rotary axis of said case and extending from one of said side gears;
   a second shaft supported rotatably about said rotary axis and extending from the other side gear in the opposite direction to said first shaft;
   driven means for transmitting driving force to the first and second shafts;
   first means for rotating the driven means;
   a worm wheel provided on one of said case and the first and second shafts;
   second means for rotating the worm wheel having a worm meshing with the worm wheel and disposed in the differential carrier, a shaft of the motor being connected to the worm; and a control device means for calculating on the basis of signals from a steering angle sensor and a vehicle speed sensor to control the number of revolutions of said second means.

7. A differential gear as claimed in claim 6, further comprising an auxiliary gear device provided in relation to one of the first and second shafts.

8. A differential gear as claimed in claim 7, wherein said auxiliary gear device includes a non-rotatable case, pinions disposed rotatably in the non-rotatable case and a pair of side gears disposed rotatably in said non-rotatable case to mesh with the pinions.

* * * * *